United States Patent

Brooks

[11] Patent Number: 5,913,938
[45] Date of Patent: Jun. 22, 1999

[54] GEAR REDUCTION ASSEMBLY

[76] Inventor: Eddie L. Brooks, 1189 Thomas Grove Rd., Lot A, McComb, Miss. 39652

[21] Appl. No.: 08/912,397

[22] Filed: Aug. 18, 1997

[51] Int. Cl.[6] ........................................................ F16H 1/14
[52] U.S. Cl. ................................................................. 74/417
[58] Field of Search ............................. 74/417, 381, 424, 74/665 F, 665 G; 475/222, 343, 202; 180/76, 374, 377, 379

[56] References Cited

U.S. PATENT DOCUMENTS

| | | |
|---|---|---|
| 609,344 | 8/1898 | Harrity . |
| 1,017,954 | 2/1912 | Cake . |
| 1,290,709 | 1/1919 | Bruah ........................................ 180/337 |
| 1,614,992 | 1/1927 | Roberts ...................................... 74/424 |
| 1,631,996 | 6/1927 | Wirrer . |
| 2,906,360 | 9/1959 | Dailey, Jr. ................................. 74/424 |
| 3,361,222 | 1/1968 | Lamburn ............................. 475/202 X |
| 3,378,093 | 4/1968 | Hill ....................................... 74/665 F |
| 3,463,029 | 8/1969 | Chow . |
| 3,478,620 | 11/1969 | Shimankas . |
| 3,580,350 | 5/1971 | Arkus-Duntov . |
| 4,142,422 | 3/1979 | Haefner . |
| 4,358,243 | 11/1982 | Heath . |
| 4,499,790 | 2/1985 | Helms . |
| 4,502,347 | 3/1985 | Norris et al. . |
| 4,525,987 | 7/1985 | Werner et al. . |
| 4,685,340 | 8/1987 | Shust et al. . |
| 5,065,639 | 11/1991 | Flanhardt et al. . |
| 5,107,951 | 4/1992 | Kawamura . |
| 5,358,457 | 10/1994 | Braun . |

FOREIGN PATENT DOCUMENTS 53-40148   4/1978   Japan .

Primary Examiner—Charles A. Marmor
Assistant Examiner—Marcus Charles
Attorney, Agent, or Firm—Millen, White, Zelano & Branigan, P.C.

[57] ABSTRACT

A gear reduction assembly having directly cooperating gears which serve to rotatably connect an input shaft to an output shaft through an intermediate shaft. The input and output shafts have parallel axes of rotation and extend, respectively, from seals in opposite sides of a housing. The inner ends of the input and output shafts are spaced from one another and are each provided with an identical pinion gear. The intermediate shaft is rotatably carried between the pinion gears and has an axis of rotation positioned at right angles to the axes of rotation of the input and output shafts. A pair of differently sized ring gears having different numbers of teeth are affixed in a back-to-back relationship on the intermediate shaft. The pinion gear on the input shaft engages the relatively smaller ring gear on the intermediate shaft whereas the pinion gear on the output shaft engages the relatively larger ring gear on the intermediate shaft. The gear reduction assembly is utilized in the power train of a vehicle and is positioned between the transmission and propeller shaft to permanently reduce the gear ratio between the engine and one or more drive axles.

2 Claims, 2 Drawing Sheets

GEAR REDUCTION ASSEMBLY

FIELD OF THE INVENTION

The present invention relates generally to machine elements or mechanisms and, in particular, to a gearing system having directly cooperating gears with intersecting axes of rotation.

BACKGROUND OF THE INVENTION

A transmission provides different gear ratios between the engine and drive wheels of a typical land vehicle. The transmission enables the vehicle to accelerate from rest up to a maximum speed through a wide speed range while the engine operates efficiently. In most applications, the transmission is positioned in the vehicle power train between the engine and the propeller shaft. The engine's power flows through the transmission and propeller shaft and is delivered to the differential and drive axles.

Most vehicle transmissions operate within a preset range of gear ratios. While this is not a problem for passenger cars used for commuting and the like, it can be a problem for special purpose vehicles, such as pickup trucks, used for carrying or towing heavy loads. Excessive engine and transmission wear, fuel consumption, and operating costs can result from gear ratios that are set too high at the time of their manufacture. A need, therefore, exists for an "add-on" assembly which can be easily and economically inserted into the power train of a vehicle for reducing the gear ratio between the engine and drive axles.

SUMMARY OF THE INVENTION

In view of the limitations associated with known vehicle transmissions, it is a principal object of the invention to provide a gear reduction assembly which can be operatively connected between a factory installed transmission and propeller shaft to reduce the gear ratio between the engine and drive axles of the associated vehicle.

It is another object of the invention to provide a gear reduction featuring spiral bevel gears. The tooth inclination of such gears brings more teeth in contact at any one time than with equivalent straight bevel gears. The result is smoother and quieter operation, particularly at high speeds, and greater loadcarrying ability than with straight bevel gears.

It is a further object of the invention to provide a gear reduction assembly of the type described which, during use, will increase torque imparted to the drive axles, decrease fuel consumption, increase engine and transmission life, and reduce vehicle operating costs.

It is an object of the invention to provide improved elements and arrangements thereof in a gear reduction assembly for the purposes described which is lightweight in manufacture, inexpensive in construction and installation, and fully effective in use.

Briefly, the gear reduction assembly in accordance with this invention achieves the intended objects by featuring directly cooperating gears which serve to rotatably connect an input shaft to an output shaft through an intermediate shaft. The inner ends of the input and output shafts are spaced from one another and are each provided with a substantially identical pinion gear. The intermediate shaft is rotatably carried between the pinion gears and has a pair of differently sized ring gears. The larger ring gear includes more teeth than the smaller ring gear. The pinion gear on the input shaft engages the smaller ring gear whereas the pinion gear on the output shaft engages the larger ring gear. When rotated, the input shaft drives the output shaft with an accompanying mechanical advantage.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
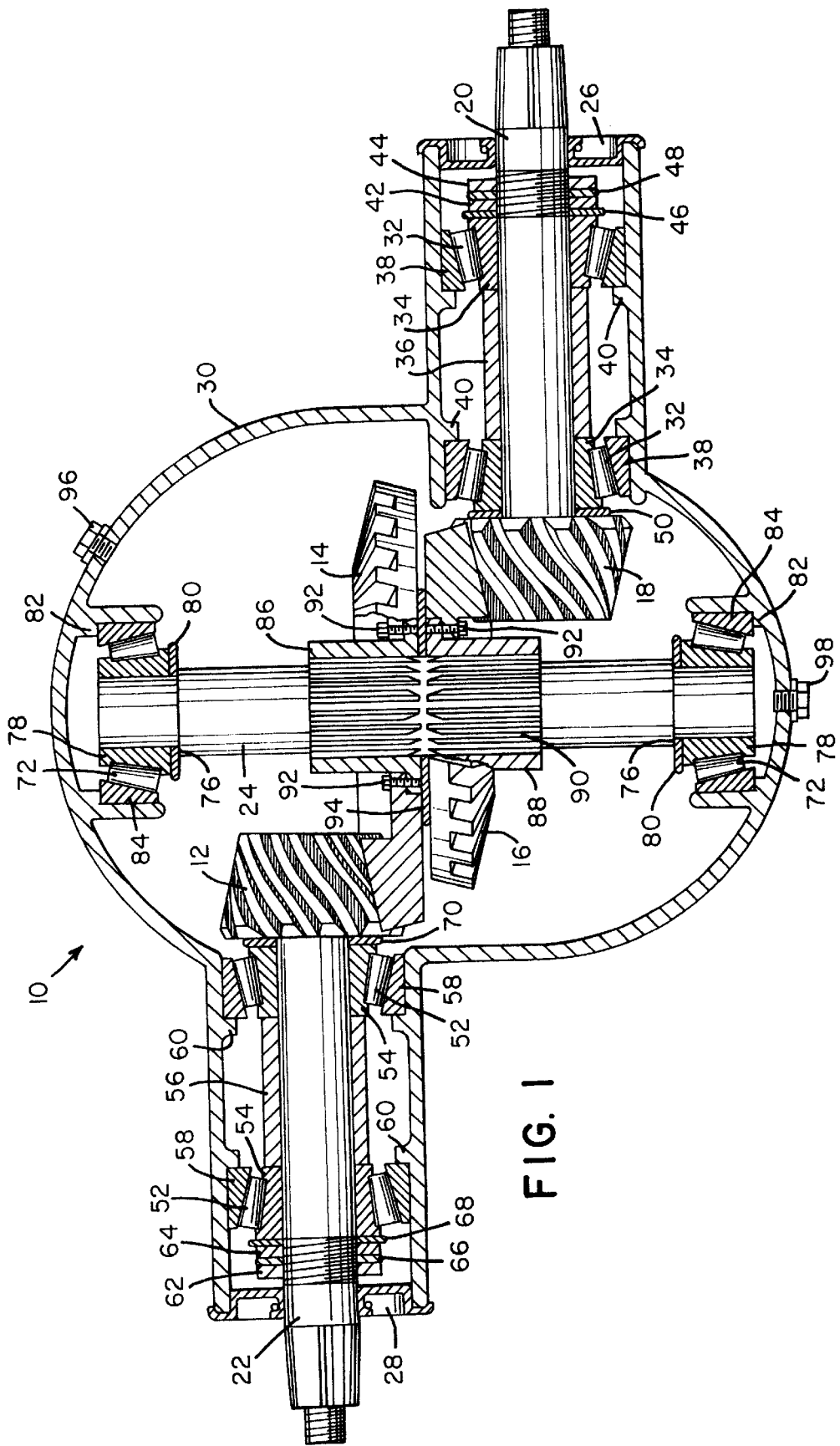
FIG. 1 is a cross-sectional view of a gear reduction assembly in accordance with the present invention.

Referring now to the FIGS., a gear reduction assembly in accordance with the present invention is shown at 10. The assembly 10 includes four, directly cooperating gears 12, 14, 16 and 18 which serve to rotatably connect an input shaft 20 to an output shaft 22 through an intermediate shaft 24. The input shaft 20 and output shaft 22 have parallel axes of rotation and extend, respectively, from seals 26 and 28 in opposite sides of a housing 30. The inner ends of the input and output shafts 20 and 22 are spaced from one another and are provided with substantially identical pinion gears 12 and 18. The intermediate shaft 24 is rotatably carried between the pinion gears 12 and 18 and has an axis of rotation positioned at right angles to the axes of rotation of both the input shaft 20 and output shaft 22. A pair of ring gears 14 and 16, having different numbers of teeth, are affixed in a back-to-back relationship on the intermediate shaft 24. The pinion gear 18 on the input shaft 20 engages the relatively smaller, ring gear 16 on the intermediate shaft 24 whereas the pinion gear 12 on the output shaft 22 engages the relatively larger, ring gear 14 on the intermediate shaft. When rotated during use, the input shaft 20 drives the output shaft 22 with an accompanying mechanical advantage.

The input shaft 20 is rotatably supported within the housing 30 by a pair of roller bearings 32 spaced along its length. The inner races 34 of the bearings 32 are maintained at a fixed distance from each other by a tubular spacer 36 encircling the input shaft 20. The outer races 38 of the bearings 32, however, are held apart by stops 40 projecting inwardly from the side walls of the housing 30. A pair of lock nuts 42 and 44 threaded onto the outer end of the input shaft 20, along with adjacent washers 46 and 48, serve to drive the bearings 32 together and fix the position of the pinion gear 18 within the housing 30. Fine longitudinal adjustment of the position of the pinion gear 18 is achieved by varying the thickness of the washer 50.

Like the input shaft 20, the output shaft 22 is rotatably supported by spaced roller bearings 52. The inner races 54 of the bearings 52 are maintained in position by a tubular spacer 56 whereas the outer races 58 are supported by stops 60. Similarly, lock nuts 62 and 64 and washers 66 and 68, secured to the output shaft 22, fix the position of the pinion gear 12. A washer 70 of predetermined thickness is positioned on the output shaft 22 and against the pinion gear 12 to finely adjust the position of the gear 12.

The intermediate shaft 24 is rotatably journaled at its opposite ends in roller bearings 72. Shoulders 76 on the intermediate shaft 24 set the respective positions of the inner races 78 of the bearings 72. Spacing washers 80, of predetermined thickness and located between the shoulders 76 and inner races 78, permit the vertical positioning of the intermediate shaft 24 to be adjusted as desired by a user. Stops 82 projecting inwardly from the side walls of the housing 30 retain the outer races 84 of the bearings 72.

Although the pinion gears 12 and 18 are preferably machined onto the ends of the shafts 20 and 22 so as to form an integral part thereof, the ring gears 14 and 16 are preferably releasably secured to the intermediate shaft 24. As shown, a pair of ring gear cranks 86 and 88 are connected by means of grooves 90 to the intermediate shaft 24 for rotation therewith. Bolts 92 secure the ring gears 14 and 16 to the cranks 86 and 88. A disk-shaped spacer 94 separates the cranks 86 and 88 as well as the ring gears 14 and 16.

Openings are provided in the housing 30 for adding and withdrawing lubrication oil. An opening, normally closed by bolt 96, in the top of the housing 30 is provided for filling the housing 30 with oil prior to normal use of the assembly 10. An opening, closed by bolt 98, in the bottom of the housing 30 permits used oil to be drained from the housing 30.

Figure 2:
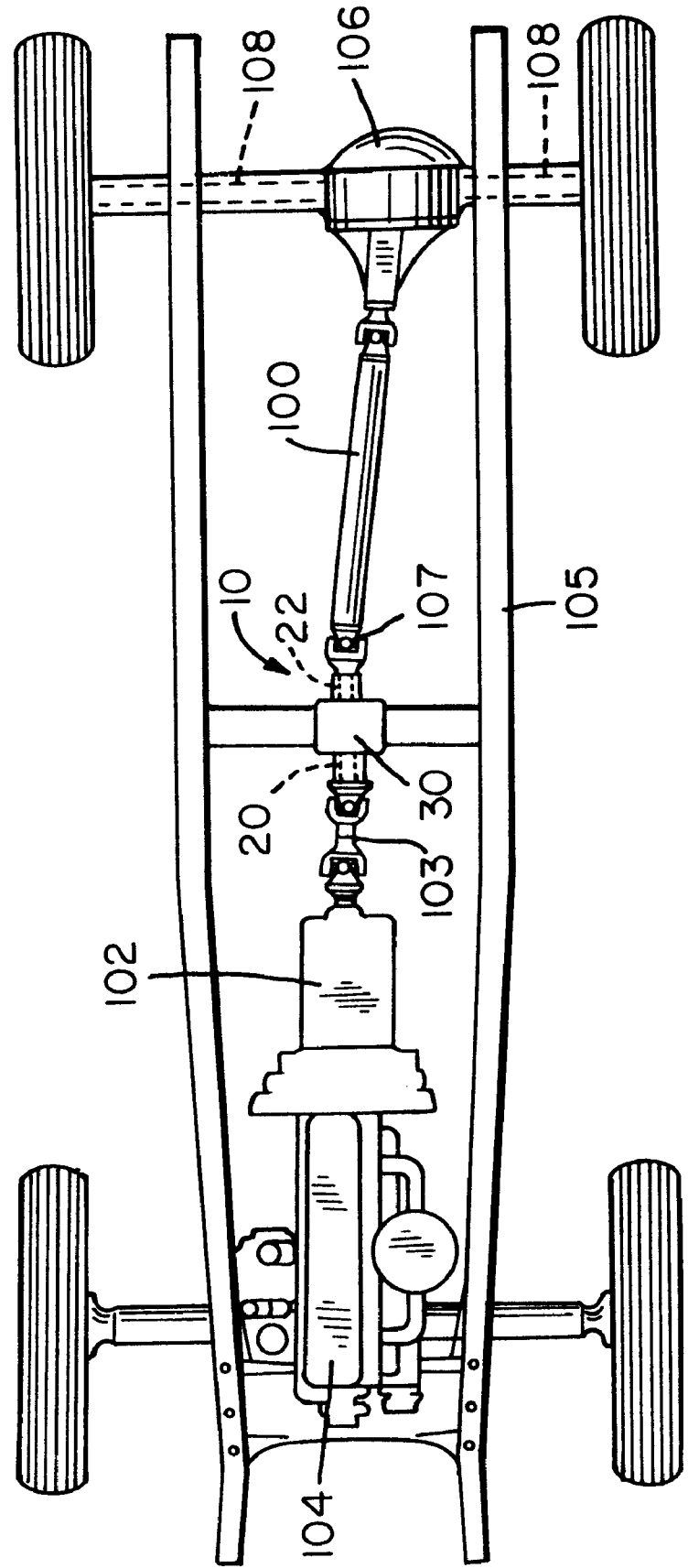
FIG. 2 is a diagrammatic view of a vehicle power train including the transmission of FIG. 1.

Installation of the assembly 10 in a vehicle unequipped with such is straight forward and is illustrated diagrammatically in FIG. 2. The propeller shaft 100 of the vehicle is first removed and shortened somewhat using conventional machine tools and processes. Next, the input shaft 20 is aligned with the transmission 102 and is joined to it with connector 103. The housing 30 is then secured by any suitable means to the undercarriage 105 of the vehicle. Finally the shortened propeller shaft 100 is joined to the output shaft 22 of the assembly 10 using connector 107. When the vehicle engine 104 is now energized to drive the transmission 102, power will flow through the assembly 10, propeller shaft 100, differential 106 and drive axles 108 to drive wheels 110. The gear ratio between the engine 104 and drive axles 108 is permanently reduced by inclusion of the assembly 10 in the vehicle power train.

While the invention has been described with a high degree of particularity, it will be appreciated by those skilled in the art that numerous modifications and substitutions may be made thereto. For example, the gear ratio provided by the gears 12, 14, 16 and 18 is largely a matter of choice and may be varied as desired. Therefore, it is to be understood that the present invention is not limited to the sole embodiment described above, but encompasses any and all embodiments within the scope of the following claims.

I claim:

1. A power train for a land vehicle comprising:

an internal combustion engine;

a transmission operatively joined to said internal combustion engine;

a gear reduction assembly having an input shaft geared to an output shaft, said input shaft being joined to said transmission so as to be rotated thereby;

a first pinion gear positioned on said input shaft;

a second pinion gear positioned on said output shaft;

the axes of rotation of said input shaft and said output shaft being parallel;

an intermediate shaft positioned between said first pinion gear and said second pinion gear, the longitudinal axis of said intermediate shaft being positioned at right angles to the respective axes of rotation of said input and output shafts;

a first ring gear positioned on said intermediate shaft for rotation therewith and cooperatively engaged with said first pinion gear;

a second ring gear positioned on said intermediate shaft for rotation therewith adjacent said first ring gear and cooperatively engaged with said second pinion gear;

said first pinion gear having the same number of teeth as said second pinion gear;

said first ring gear having a lesser number of teeth than said second ring gear so that one rotation of said input shaft results in more than one rotation of said output shaft.

2. The power train according to claim 1 wherein said first and second pinion gears and said first and second ring gears are spiral bevel gears.

* * * * *